United States Patent [19]

Dobie et al.

[11] Patent Number: 5,026,004
[45] Date of Patent: Jun. 25, 1991

[54] VARIABLE AIR INTAKE RAMPS FOR AEROSPACE VEHICLES

[75] Inventors: William B. S. Dobie, Bristol; Nigel Penistone, North Humberside, both of England

[73] Assignee: British Aerospace Public Limited Company, London, England

[21] Appl. No.: 398,866

[22] Filed: Aug. 25, 1989

[30] Foreign Application Priority Data

Sep. 9, 1988 [GB] United Kingdom ............... 8821278

[51] Int. Cl.⁵ ............................................. B64D 33/02
[52] U.S. Cl. ................................................. 244/53 B
[58] Field of Search ............... 244/53 B; 137/15.1, 137/15.2

[56] References Cited

U.S. PATENT DOCUMENTS

| | | | |
|---|---|---|---|
| 3,265,331 | 8/1966 | Miles | 244/53 B |
| 3,324,660 | 6/1967 | Lane | 60/244 |
| 3,430,640 | 3/1969 | Lennard | 137/15.1 |
| 3,456,664 | 7/1969 | Foote | 137/15.2 |
| 4,372,505 | 2/1983 | Syberg | 244/53 B |
| 4,463,772 | 8/1984 | Ball | 137/15.2 |

Primary Examiner—Joseph F. Peters, Jr.
Assistant Examiner—Anne E. Bidwell
Attorney, Agent, or Firm—Cushman, Darby & Cushman

[57] ABSTRACT

The invention relates to engine air intakes for aerospace vehicles in which a variable geometry ramp system is employed for matching air intake flow to propulsion engine demand. To alleviate the induced high pressure loads on the ramps and the ramp actuators arising from the air intake flow a reacting pressure is applied to the opposite face of the ramps. The ramp assembly in addition to defining the required air intake duct geometry further defines the adjacent boundary of an enclosure which is pressurized by ram air and vented as required as a function of the load on one of the ramp actuating jacks to give the desired load alleviation.

2 Claims, 2 Drawing Sheets

VARIABLE AIR INTAKE RAMPS FOR AEROSPACE VEHICLES

This invention relates to engine air intakes for aerospace vehicles and more particularly to those intake systems comprising a fixed ramp and one or more adjustable ramps by which means air intake flow is matched to propulsion engine demand.

Optimised matching of air intake flow to propulsion engine demand is of particular importance if unacceptable performance losses, which may arise from drag due to spillage, shock waves etc, are to be avoided. This is especially the case in aerospace vehicles having wide ranging engine air requirements within the vehicles operating parameters, which may be determined, amongst other things, by Mach number. As is well known in the art, the air intake flow requirements for a high performance engine are such that, at start up, or in the subsonic mode the cross-sectional area of the air intake duct must be large. At transonic speeds, typically M-1.5 the air intake demand will be of a lesser order whereas at speeds approaching M=5 the captured air is more highly compressed, and consequently the intake throat cross-section, will be small.

In order to achieve these wide ranging parameters within a single system, it is known to provide two dimensional, variable, air intake ramps for high performance vehicles comprising a plurality of ramps, the most forward of which is fixed, a second ramp hinged at its front edge to the fixed ramp and third and subsequent ramps hinged to each other at their adjacent edges. The number of ramps is determined by the individual air intake configuration, relative movement of the ramp portions varying the air intake geometry. Actuators, for example irreversible screw jacks, interconnect with selected ramps by which means the ramp system is moved synchronously and automatically set by the air intake control system.

One of the problems in this arrangement is that the intake flow induces high pressure loads on the ramps and consequently on the ramp actuators. This results in actuators significantly sized to react to these high pressures which may be undesirable or unacceptable in terms of bulk and weight. It is the object of the present invention to provide a variable air intake ramp arrangement including ramp pressure load compensating means, by which means actuator loads a reduced to an acceptable degree.

According to the present invention there is provided a variable air intake ramp control arrangement for an aircraft propulsion engine, said air intake control arrangement comprising:

an air intake duct, variable geometry ramp means mounted within said air intake duct and movable to selected positions across said air intake duct for controlling the amount of air passing therethrough to match propulsion engine demand and actuator means for moving said ramp means and for reacting induced intake air pressure loads on said ramp means; characterised in that said ramp means, in addition to defining the fluid flow passageway of said air intake duct, further defines the adjacent boundary of an enclosure whose enclosed volume is variable as a function of the adjustment of said ramp means and includes ramp pressure load compensating means whereby for inducing a reacting pressure on said ramp means such that the induced intake air pressure load on said ramp means and said actuator means is correspondingly alleviated.

One embodiment of the invention will now be described, by way of example only, in which.

Figure 1:
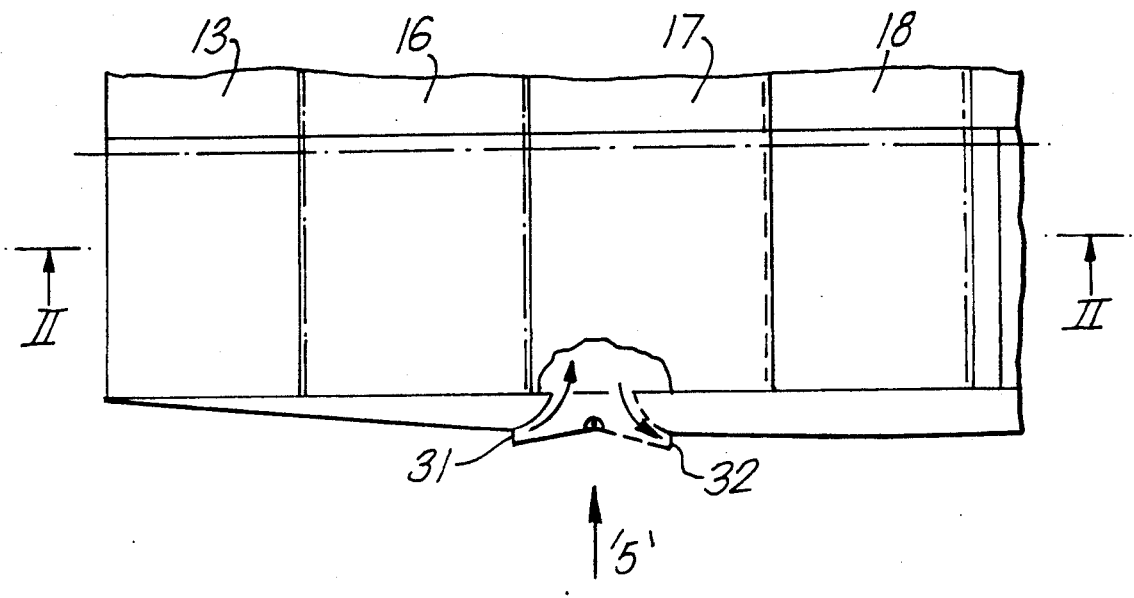
FIG. 1 illustrates, in diagrammatic side elevation port side only drawn, an arrangement of variable air intake system.
Figure 2:
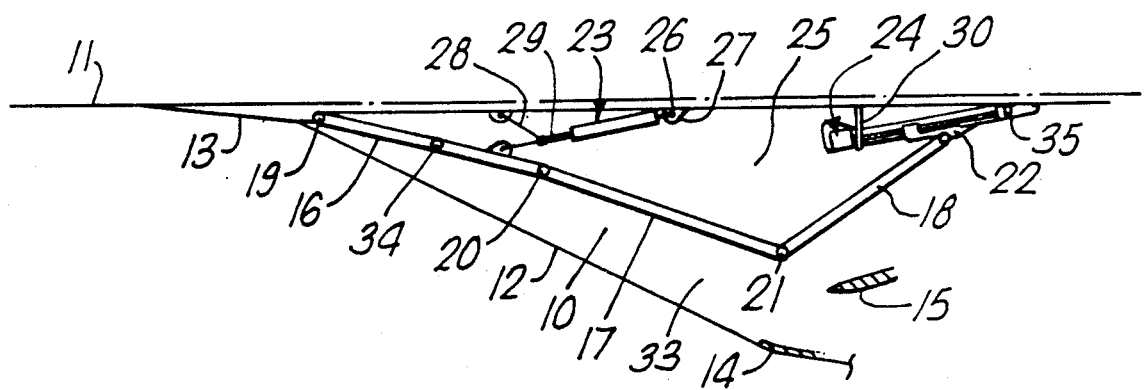
FIG. 2 is a section through the air intake system viewed along a line II—II in FIG. 1.

Referring to the drawings, FIG. 1 illustrates a part side elevation on the air intake of the present invention and FIG. 2 is a sectional view through the intake. This indicates that, in this embodiment it is an air intake arrangement mounted upon the side of the aerospace vehicle. Equally, however, it would be applicable to a chin-intake arrangement, ie, an intake mounted to the underside of an aircraft fuselage or wing.

As clearly illustrated in FIG. 2 the variable air intake 10 mounted upon a vehicle 11 includes an air intake opening 12 whose opening is defined by a fixed ramp 13 and an intake lip 14. An air intake flow splitter 15 is illustrated but not described further here. The air intake control system includes a variable ramp arrangement comprising a series of interconnected ramp panels, three in number, indicated as 16-18 inclusive on FIGS. 1 and 2. Panel 13 includes a pivotal attachment 19 to the fixed ramp 13 at its forward end and a pivotal attachment 20 at its rearward end to ramp panel 17 which in turn is pivotally attached at 21 to the extreme rearward ramp panel 18 which terminates such that it slidably engages at 22 at guideway 35. Two irreversible screw-jacks 23 and 24 are mounted within the enclosure 25 defined by the ramp elements 16-18 inclusive. The screw jack 23 is pivotally attached at 26 to the vehicle side structure 27 and to the ramp panel 16. A diaphragm 28 extends from the jack ram 29 in a forwardly diagonal direction and is similarly pivotally attached to the vehicle side structure 27. The screw-jack 24 lies substantially in alignment with the guideway 35 and is pivotally interconnected to the ramp panel 18. It is supported at 30 off the vehicle side structure 27. By means of these jack pairs, the geometry of the air intake ramps may be varied in accordance with engine demand parameters to give the desired intake flow. The variable ramp arrangement further includes ram air inlet 31 and outlet 32, communicating with the enclosure 25.

Figure 3:
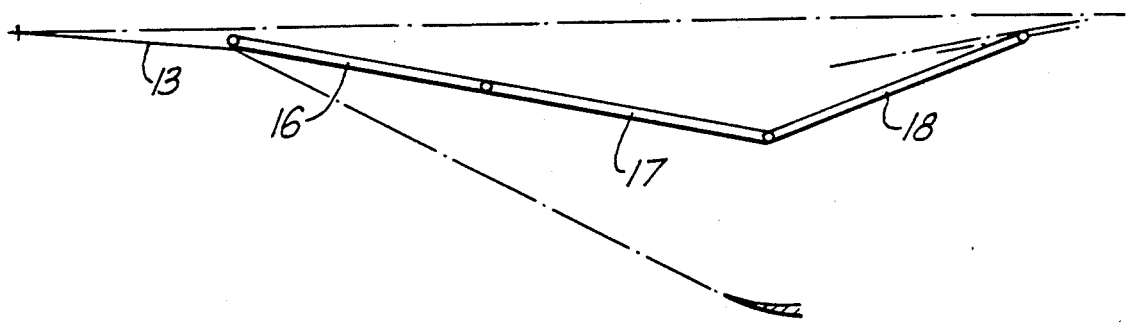
FIG. 3 depicts a schematic arrangement, in side elevation, of a variable air intake system at a particular operational setting.
Figure 4:
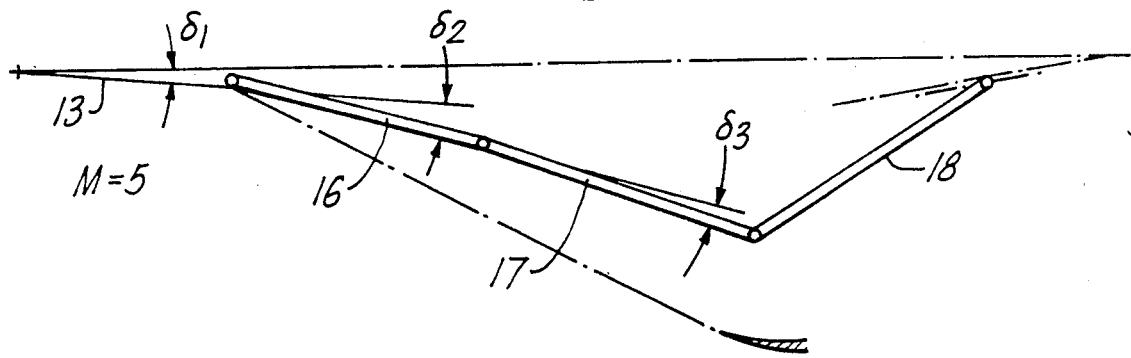
FIG. 4 depicts the variable air intake system at an alternative setting.
Figure 5:
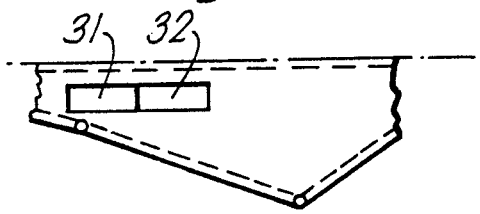
FIG. 5 is a part side elevation on the intake viewed in direction of arrow 5 in FIG. 1.

Although not illustrated here the forward zone 34, that is the extreme forward portion of the enclosure 25 is permanently vented to the local external airstream. FIGS. 3 and 4 illustrate, by way of example, alternative settings of the intake ramps to meet particular requirements. FIG. 3 illustrates the transonic M=1.5 condition and FIG. 4 the supersonic M=5 condition.

The principal object of the present invention is to achieve reasonable jack loads, particularly relevant in this embodiment to the actuator 24 which drives the ramp panel 18 via its engagement in the guideway 35 and by which means, in conjunction with actuation of the forward actuator 23, the ramp geometry is varied automatically in accordance with engine demand. The ramp pressures and consequently the actuator loads are alleviated to a substantial degree by pressurising the enclosure 25 via the ram air inlet 31, which is actively controlled together with the exhaust demanded, the enclosure 25 is vented via the outlet 32 to the local external airstream. The extreme forward zone 34 is permanently vented to the local external airstream.

We claim:

1. A variable air intake arrangement for an aircraft propulsion engine, said air intake arrangement comprising:

an air intake duct, variable geometry ramp means mounted within said air intake duct and movable to selected positions across said air intake duct for controlling the amount of air passing therethrough to match propulsion engine demand, actuator means for moving said ramp means and for reacting induced intake air pressure loads on said ramp means, an air intake duct opening defined by a forward fixed ramp and an intake lip, variable geometry ramp means comprising at least three interconnected adjustable ramp panels, a first ramp panel having a forward pivotal attachment to said forward fixed ramp and a pivotal attachment at its rearward end to a second ramp panel, said second ramp panel pivotally attached at its rearward end to a third ramp panel said third ramp panel slidably engaging guideway means at its rearward end; said variable geometry ramp means further defining an enclosure in which is mounted first and second irreversible screw jacks pivotally attached to aircraft structure and to first and third ramp panels respectively, said enclosure further including ram air intake means and first and second outlet means, said first air outlet means permanently vented to local external airstream adjacent the extreme forward position of said variable geometry ramp means, said second air outlet means actively controlled together with said ram air intake means as a function of load on said second irreversible screw jack.

2. A variable air intake ramp control arrangement for an aircraft propulsion engine, comprising:

an air intake duct;

variable geometry ramp means mounted within said intake duct and movable to selected positions across said air intake duct for controlling the amount of air passing therethrough so as to match propulsion engine demand;

actuator means for moving said ramp means and for reacting induced intake air pressure loads on said ramp means;

said ramp means characterized in that in addition to defining the fluid flow passageway of said air intake duct, said ramp means further define the boundary of an enclosure whose enclosed volume is a function of the adjustment of said ramp means and includes a ramp pressure load compensating means, variably controllable as a function of said actuation for inducing a ramp pressure on said ramp means such that the induced intake air pressure load on said ramp means and said actuator means is correspondingly alleviated;

said ramp pressure load compensating means comprising:

ramp inlet means whereby a portion of external air flow is diverted into and pressurizes said enclosure to induce said reacting pressure on said ramp means; and air outlet means for venting excess pressure from said enclosure to the local external air stream.

* * * * *